Sept. 2, 1947.  L. MICHELOT  2,426,837
WATER COOLED SOLDER SPLASH GUARD
Filed March 8, 1944
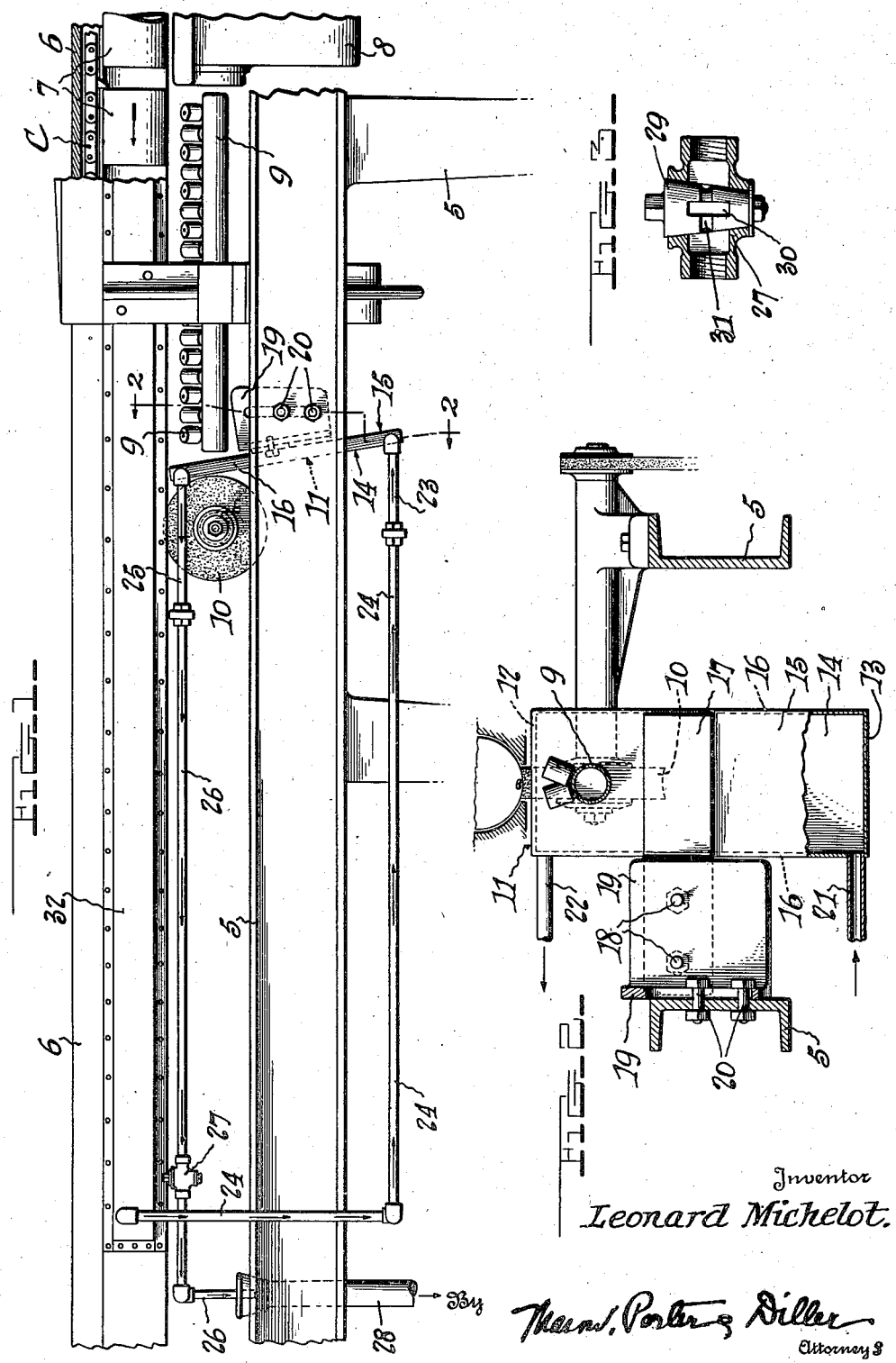
Inventor
Leonard Michelot.

Patented Sept. 2, 1947

2,426,837

UNITED STATES PATENT OFFICE 2,426,837

WATER-COOLED SOLDER SPLASH GUARD

Leonard Michelot, San Jose, Calif., assignor to Continental Can Company, Inc., New York, N. Y., a corporation of New York Application March 8, 1944, Serial No. 525,577

8 Claims. (Cl. 113—60)

The invention relates generally to the art of making cans and primarily seeks to provide a novel water cooled solder splash guard mounted on a can body maker between the wiper roll and the adjacent sweater burner so as to protect the wiper roll against overheating and scorching.

In the manufacture of can bodies blanks are intermittently fed in processional order through various work stations including notching and hook forming stations and the main forming station where they are shaped about a horn and have their hooks brought together and bumped to form side seams. After leaving the forming station the formed can bodies are rapidly and continually fed through an outside horse, first over a solder bonding station whereat solder is applied to the can body side seams by engagement therewith of a long soldering roll rotating in molten solder, thence over a line of sweater burners which serve the purpose of keeping the silver-lead solder applied to the can body side seams in molten state for an interval of time sufficient to facilitate proper sweating in of the seam bonding solder, and thence over a rapidly rotating wiper roll engageable with the can body side seams and effective to wipe surplus solder therefrom. The proximity of the sweater burner line causes the wiper roll to become overheated and scorched, with the result that said roll is no longer able efficiently to perform its intended function. Thus frequent replacements of wiper rolls have been necessary, with resultant cost and loss of a considerable amount of production time. Efforts to solve the problem by interposing an ordinary shield between the wiper roll and sweater burner have failed because the shield soon became hot and in turn transferred the heat from the sweater burner to the adjacent wiper roll in the same objectionable manner above referred to. Such shields also presented the additional problem of receiving and accumulating solder splash thrown off by the rapidly rotating wiper roll in such fashion as to interfere with proper operation of the wiper roll. It is the purpose of the present invention to provide a novel form of solder splash shield having provision for continuously conveying away the heat picked up from the sweater burner line, thereby protecting the wiper roll against overheating and scorching.

In its more detailed nature the invention resides in providing a hollow solder splash shield disposed between the wiper roll and the adjacent sweater burner, and means for providing a continuous flow of a cooling liquid therethrough for continuously conveying away from said shield head radiated thereto from the sweater burner.

Another object of the invention is to provide means for adjustably mounting the shield so that its position can be changed accordingly as the set up on the body marker is altered to adapt it to the making of cans of different sizes.

With the above and other objects in view that will hereinafter appear, the nature of the invention will be more clearly understood by reference to the following detailed description, the appended claims, and the several views illustrated in the accompanying drawings.

In the drawings:

Figure 1 is a side elevation illustrating the invention incorporated in a standard body maker, parts being broken away and in section.

Figure 2 is a vertical cross sectional view taken on the line 2—2 on Figure 1.

Figure 3 is a detail vertical cross section illustrating the shutoff valve.

In the example of embodiment of the invention herein illustrated 5 designates a portion of the frame of a standard body maker wherein is included the usual outside horse 6 through which the can bodies 7 formed in the body maker are rapidly and continuously conveyed by a conveyor chain C, first over the solder bonding station generally designated 8, thence over the sweater burner line 9, and thence over the wiper roll 10. As is well known in the art, solder is applied to the side seams of the can bodies as they pass over the solder bonding station by means of a long applicator roll rotating in a bath of molten solder. The solder applied to the can body side seams is heated and maintained in molten state while passing over the sweater burners 9 so as to facilitate sweating in of the bonding solder into the can body side seam structures, and the surplus of bonding solder is wiped off by contact of the rapidly rotating wiper roll 10 with the rapidly traveling can body side seams. All of the structure and practice above referred to is conventional and well known to workers in the art.

In the practical development of the invention a hollow solder splash shield generally designated 11 is placed uprightly in the manner illustrated in Figure 1, between the sweater burner line 9 and the adjacent wiper roll 10. The shield is formed to include a top 12, a bottom 13, front and rear faces 14 and 15, and sides 16. See Figures 1 and 2.

A mounting plate 17 is secured to the rear face of the hollow shield and is in turn secured as at 18 to a mounting bracket 19 which is vertically-adjustably secured as at 20 to one side beam of the body maker framing 5 in the manner clearly illustrated in Figure 2.

The hollow shield is provided with a laterally extended inlet 21 at the bottom or lower end thereof, and a similarly extended outlet 22 is provided at the top or upper end thereof. The inlet 21 is connected by a flexible duct 23 with a supply line 24, and the outlet 22 is connected by a flexible duct 25 with a discharge line 26. A control or shutoff valve 27 is connected in the discharge line 26, and at its end, the discharge line preferably discharges into the drain pipe 28.

It will be observed by reference to Figure 3 of the drawing that the valve plug 29 is equipped with a main opening 30 for affording free communication through the discharge line 26, and this plug also is provided with bleed clearance 31 for permitting a certain amount of flow through the shield and the discharge line 26 even when the plug 29 is turned to the valve closed position.

A cooling medium such as cold water is supplied to the supply line 24 from any suitable source, but in the present illustration said line is shown as connected with the cooling jacketing 32 which may be attached to the horse 6 and through which the cooling fluid may be supplied from any suitable source (not shown). The provision of the horse cooling jacketing forms no part of the present invention and is merely illustrated as an acceptable form of cooling fluid supply.

By arranging the hollow shield 11 uprightly and connecting the supply and discharge lines in the particular manner described, the maintaining of a full condition of the shield and a constant flow of cooling medium therethrough is insured. It will be obvious that the constantly flowing cooling medium will convey from the shield 11 heat radiated thereto from the sweater burner 9. Thus the shield 11 will protect the wiper roll 10 from the heat radiated by the sweater burner 9, and overheating and scorching of the wiper roll will be prevented.

By reason of the constant circulation of the cooling medium through the hollow shield 11, said shield will be maintained in a relatively cool state so that solder splash thrown off by the wiper roll 10 and contacting the same will not adhere to and accumulate on said shield in a manner for interfering with the proper operation of the wiper roll, but rather will strike the shield and be cooled thereby so as to fall free and be subject to salvage.

While one form of the invention has been shown for purpose of illustration, it is to be clearly understood that various changes in the details of construction and arrangement of parts may be made without departing from the spirit and scope of the invention as defined in the appended claims.

I claim:

1. In a can body maker, the combination with the sweater burner, the wiper roll and the horse along which the formed can bodies are conveyed with their bond solder bearing side seams disposed closely over said burner and roll so that the burner will act to maintain the seam bond solder in molten condition and the roll will wipe off surplus molten solder from the seams, of a hollow solder splash shield disposed uprightly between the wiper roll and the adjacent end of the sweater burner but spaced from said burner so as to be out of thermal contact therewith and effective to shield the roll from heat radiated from the burner.

2. In a can body maker, the combination with the sweater burner, the wiper roll and the horse along which the formed can bodies are conveyed with their bond solder bearing side seams disposed closely over said burner and roll so that the burner will act to maintain the seam bond solder in molten condition and the roll will wipe off surplus molten solder from the seams, of a hollow solder splash shield disposed uprightly between the wiper roll and the adjacent end of the sweater burner to shield the roll from heat radiated from the burner, and means for continually passing a cooling medium through said hollow shield to continuously convey away from said shield heat radiated thereto from the sweater burner.

3. In a can body maker, the combination with the sweater burner, the wiper roll and the horse along which the formed can bodies are conveyed with their bond solder bearing side seams disposed closely over said burner and roll so that the burner will act to maintain the seam bond solder in molten condition and the roll will wipe off surplus molten solder from the seams, of a hollow solder splash shield disposed uprightly between the wiper roll and the adjacent end of the sweater burner to shield the roll from heat radiated from the burner, and means for continuously flowing water through said hollow shield to continuously convey away from said shield heat radiated thereto from the sweater burner.

4. In a can body maker, the combination with the sweather burner, the wiper roll and the horse along which the formed can bodies are conveyed with their bond solder bearing side seams disposed closely over said burner and roll so that the burner will act to maintain the seam bond solder in molten condition and the roll will wipe off surplus molten solder from the seams, of a hollow solder splash shield disposed uprightly between the wiper roll and the adjacent end of the sweater burner to shield the roll from heat radiated from the burner, and means for continuously flowing water upwardly through said hollow shield to continuously convey away from said shield heat radiated thereto from the sweater burner.

5. In a can body maker, the combination with the sweater burner, the wiper roll and the horse along which the formed can bodies are conveyed with their bond solder bearing side seams disposed closely over said burner and roll so that the burner will act to maintain the seam bond solder in molten condition and the roll will wipe off surplus molten solder from the seams, of a hollow solder splash shield disposed uprightly between the wiper roll and the adjacent end of the sweater burner but spaced from said burner so as to be out of thermal contact therewith and effective to shield the roll from heat radiated from the burner, and means adjustably mounting said shield for adjustment upwardly or downwardly for proper association with travelling cans of different diameters.

6. In a can body maker, the combination with the sweater burner, the wiper roll and the horse along which the formed can bodies are conveyed with their bond solder bearing side seams disposed closely over said burner and roll so that the burner will act to maintain the seam bond solder in molten condition and the roll will wipe off surplus molten solder from the seams, of a hollow solder splash shield disposed uprightly between the wiper roll and the adjacent end of the sweater burner to shield the roll from heat radiated from the burner, means for continuously flowing water through said hollow shield to continuously convey away from said shield heat radiated thereto from the sweater burner, said last named means including a duct connecting with the shield at the top, and another duct connecting with the shield at the bottom, each said duct including a flexible portion adjacent the shield, and means adjustably mounting said shield for adjustment upwardly or downwardly for proper association with travelling cans of different diameters.

7. In a can body maker, the combination with the sweater burner, the wiper roll and the horse along which the formed can bodies are conveyed with their bond solder bearing side seams disposed closely over said burner and roll so that the burner will act to maintain the seam bond solder in molten condition and the roll will wipe off surplus molten solder from the seams, of a hollow solder splash shield disposed uprightly between the wiper roll and the adjacent end of the sweater burner to shield the roll from heat radiated from the burner, and means for continually passing a cooling medium through said hollow shield to continuously convey away from said shield heat radiated thereto from the sweater burner, said last named means including a cooling medium supply line leading to the hollow shield and a cooling medium discharge line leading from said shield, and a shut-off valve in one said line having a bleed clearance therein effective to permit a certain amount of cooling fluid flow even when the valve is closed.

8. In a can body maker, the combination with the sweater burner, the wiper roll and the horse along which the formed can bodies are conveyed with their bond solder bearing side seams disposed closely over said burner and roll so that the burner will act to maintain the seam bond solder in molten condition and the roll will wipe off surplus molten solder from the seams, of a hollow solder splash shield disposed uprightly between the wiper roll and the adjacent end of the sweater burner to shield the roll from heat radiated from the burner, and means for continually passing a cooling medium through said hollow shield to continuously convey away from said shield heat radiated thereto from the sweater burner, said last named means including a cooling medium supply line leading to the bottom of the hollow shield and a cooling medium discharge line leading from the top of said shield, and a shutoff valve in the discharge line having a bleed clearance therein effective to permit a certain amount of cooling fluid flow even when the valve is closed.

LEONARD MICHELOT.

REFERENCES CITED

The following references are of record in the file of this patent:

UNITED STATES PATENTS

| Number | Name | Date |
|---|---|---|
| 725,164 | Smith | Apr. 14, 1903 |
| 867,030 | Gardner | Sept. 24, 1907 |
| 956,180 | Rudolphi | Apr. 26, 1910 |
| 1,223,557 | Cameron | Apr. 24, 1917 |
| 1,918,197 | Sebell | July 11, 1933 |